United States Patent [19]

Simison

[11] Patent Number: 5,112,010
[45] Date of Patent: May 12, 1992

[54] AIR DRYER USING AMBIENT COLD

[75] Inventor: Paul Simison, Phoenix, Ariz.

[73] Assignee: Honeywell Inc., Minneapolis, Minn.

[21] Appl. No.: 539,499

[22] Filed: Jun. 18, 1990

[51] Int. Cl.$^5$ .............................................. B64C 1/00
[52] U.S. Cl. ................................ 244/129.1; 244/1 R;
    244/117 R; 244/163; 361/384
[58] Field of Search .................. 244/117 A, 1 R, 163,
    244/118.5, 118.1, 129.1, 117 R; 165/41,
    110–113; 34/73, 75; D13/179; 361/384, 386

[56] References Cited

U.S. PATENT DOCUMENTS

| | | | |
|---|---|---|---|
| 2,477,932 | 8/1949 | King | 244/118.5 X |
| 4,674,704 | 6/1987 | Altoz et al. | 244/1 R |
| 4,715,561 | 12/1987 | Spinosa et al. | 244/129.1 |
| 4,819,720 | 4/1989 | Howard | 244/117 A |
| 4,969,509 | 11/1990 | Merensky | 244/163 X |

*Primary Examiner*—Joseph F. Peters, Jr.
*Assistant Examiner*—Carla Mattix
*Attorney, Agent, or Firm*—Whitham & Marhoefer

[57] ABSTRACT

A system for pressurizing an electronic enclosure, such as for example a waveguide located in an unheated, unpressurized region of an aircraft, uses air from a pressurized, heated region of the aircraft and a chiller comprised of a lightweight, thermally conducting body thermally coupled to the atmosphere outside the aircraft.

7 Claims, 2 Drawing Sheets

AIR DRYER USING AMBIENT COLD

BACKGROUND OF THE INVENTION

1. Field of the Invention

The present invention generally relates to pressurizing on-board aircraft electrical enclosures, including but not limited to waveguides, and more particularly to apparatus for reducing condensation in such enclosures.

2. Description of the Prior Art

As will be appreciated by those skilled in the art, certain electronic equipment enclosures on board an aircraft, such as radar waveguides, are often pressurized with air from the aircraft passenger cabin, a relatively warm moist source of pressurizing atmosphere. The electrical equipment enclosure or waveguide may be located at least partially in a region of the aircraft that is not pressurized or heated in flight so that the temperature of this region may drop to approximately the temperature of the atmosphere outside the aircraft.

The waveguide or other pressurizing electrical equipment enclosure contemplated by this invention is air tight. Nevertheless, pressurizing air often leaks from the enclosure or waveguide, resulting in a flow of warm, moist air into the enclosure or waveguide. Thus, when the aircraft is in flight, the temperature of the waveguide or enclosure is considerably lower than the temperature of the air flowing into it to replace the air lost by leakage, and moisture in the air condenses on the interior surfaces of the waveguide or enclosure with possible deleterious effects on the operation of the equipment.

SUMMARY OF THE INVENTION

It is therefore an object of the present invention to provide a simple, economical apparatus to prevent moisture condensation as a result of make-up air flowing into a waveguide or enclosure during flight; an apparatus which does not add substantial weight to the aircraft, or draw power for its operation.

Briefly, this invention contemplates the provision of a make-up air chiller which is thermally coupled to the atmosphere outside the aircraft. Make-up air flows from a warm pressurized region of the aircraft, through the chiller and then to the equipment. In flight, the chiller lowers the temperature of the air, causing moisture to condense in the chiller so that only dry air reaches the equipment enclosure and at a temperature usually lower than the enclosure temperature.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
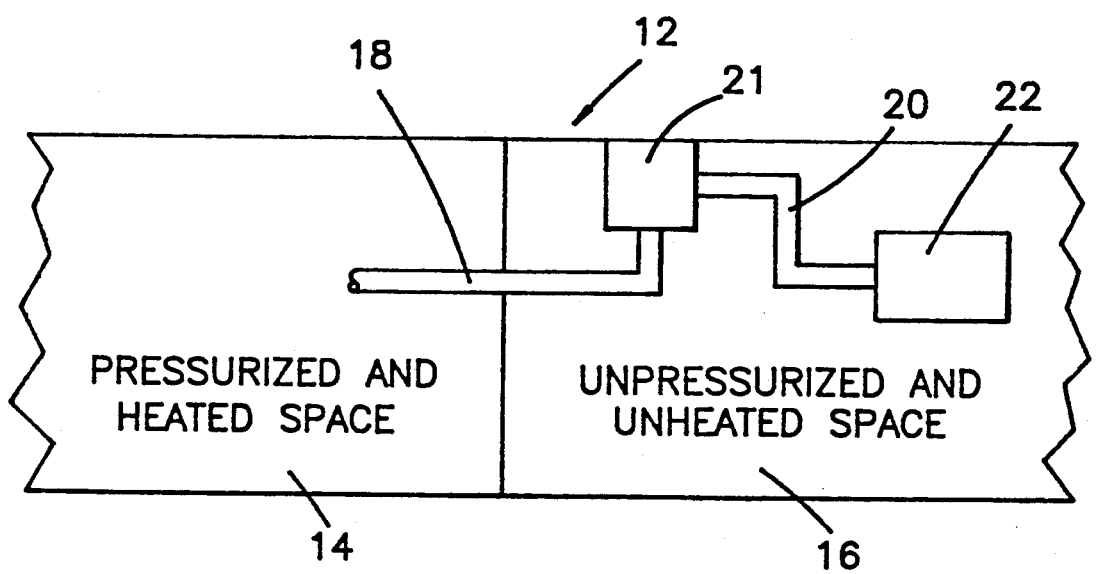
FIG. 1 is a schematic drawing of an aircraft including a schematic drawing of a system employing the teachings of this invention for reducing moisture in the make-up air used to pressurize waveguides and other electrical equipment enclosures during flight.

Referring now to the drawings, and more particularly to FIG. 1, an aircraft fuselage represented schematically and indicated by the general reference numeral 12, as a region 14 which is pressurized and heated during flight, and a region 16 which is unheated and unpressurized during flight. Make-up air from region 14 flows through a small duct or pipe 18 to an air chiller and from the chiller 21 via a duct 20 to a waveguide and/or other electrical equipment enclosure 22 located at least in part in the unheated and unpressurized region 16. Air chiller 21 is thermally coupled to the ambient atmosphere outside the aircraft as shown more clearly in FIG. 2.

Figure 2:
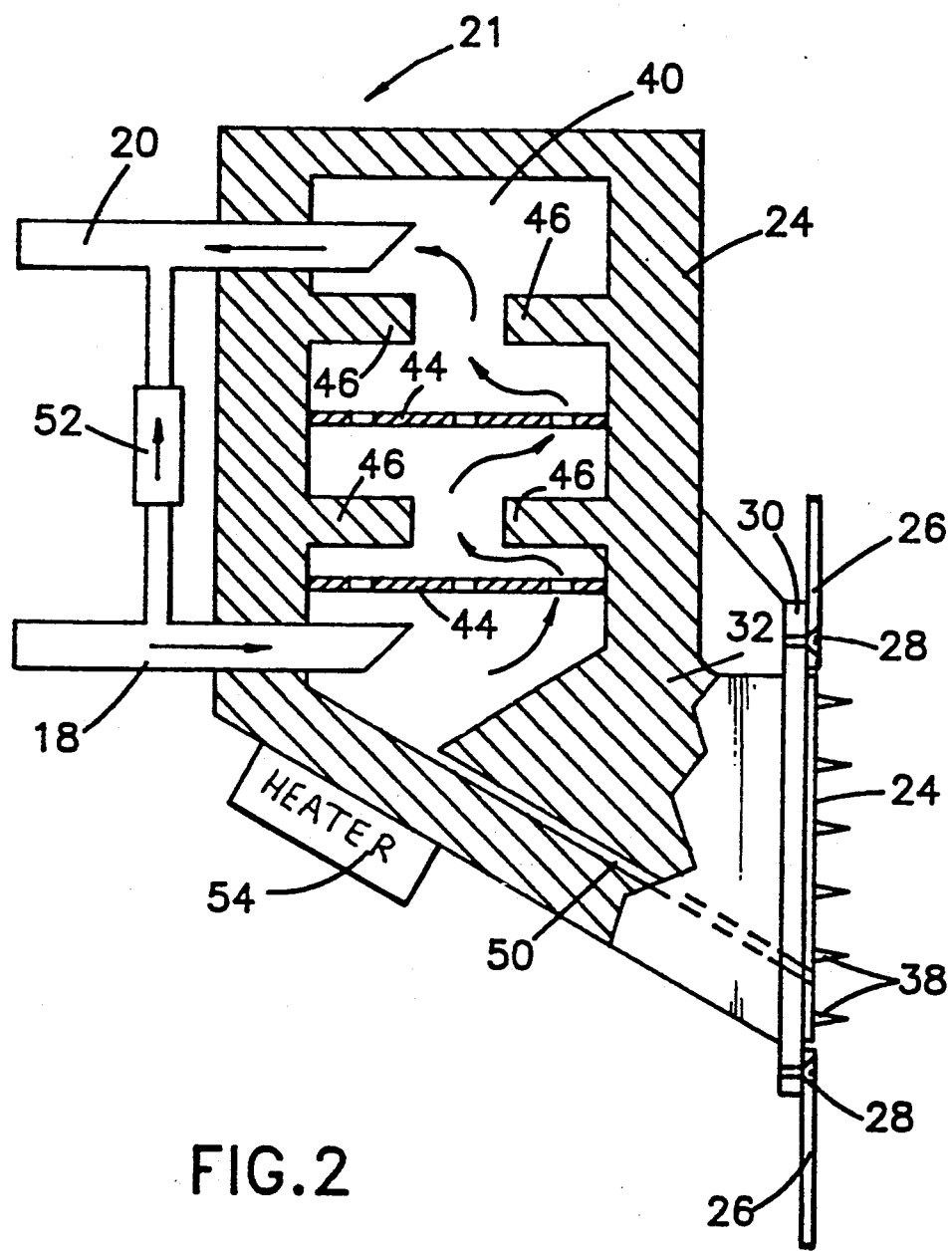
FIG. 2 is a detailed, sectional view of an apparatus for removing moisture from the make-up air in accordance with the teachings of this invention.

Referring now to FIG. 2, the chiller 21 comprises a lightweight, thermally conductive body 24, secured to the outer skin 26 of the aircraft by suitable means such as screws 28 and flange 30. A suitable light alloy, such as Duraluminum is a suitable material for the body 24. An arm 32 of the chiller body 24 extends through an opening in the outer skin 26 so that the face 34 of the arm is exposed to the atmosphere outside the aircraft body. Preferably the face 34 is generally flush with the outer surface of the skin 26 but may advantageously include a number of small heat exchanging fins 38 to enhance heat transfer between the chiller body and the outside atmosphere.

The chiller body 24 has an interior chamber 40 for collecting moisture condensed from the air passing through the chamber. The air duct 18 couples air from the heated, pressurized region 12 of the aircraft into the cavity 40 and the duct 20 couples air from the cavity to the pressurized electrical equipment enclosure, such as waveguide, located in the unheated, unpressurized regions 18 of the aircraft. A series of baffles 44 circulate the air through the cavity so that there is good thermal interchange as the air passes through the cavity with the interior walls of the cavity, including heat exchanging arms 46 which extend into the cavity.

A small passageway 50 (about 1 mm in diameter) allows condensate in the cavity 40 to drain to the atmosphere outside the aircraft. Owing to the small diameter of the passageway, the amount of air that might escape is insufficient to affect the air supply. Preferably, the condensate drain is straight in order to facilitate cleaning from outside the aircraft.

In operation, as air circulates through the chiller 21, it is cooled to approximately the temperature of the atmosphere outside the aircraft, which in flight typically would be on the order of minus 50 degrees Centigrade. Moisture in the air circulating through the chiller condenses. If the condensate is liquid, it is ejected to the outside atmosphere through the passageway 50. If the condensate is ice, it will remain in the chamber 40 until the next aircraft landing, at which time it will melt and drain. A pressure relief valve 52 bypasses the chiller in the event it becomes clogged by ice during flight. If desired, a small electric heater 54 can be attached to the chiller to defrost it upon landing when operating in cold climates.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A system for pressurizing an electronic enclosure located in unheated, unpressurized regions of an aircraft, comprising in combination:

a chiller for drying air including a lightweight thermally conducting body with a heat exchanging cavity therein, said chiller for drying air mounted in the aircraft with a portion of said body thermally coupled to the atmosphere outside said aircraft;

an air input passage in said body for coupling air into said cavity and an air output passage in said body for coupling air from said cavity; and an air input duct for coupling air from a heated, pressurized region of said aircraft to said air input passage, and an air output duct for coupling air from said air output passage to said electronic enclosure.

2. A system as in claim 1 further including a drain extending from said cavity through said body to said atmosphere outside said aircraft.

3. A system as in claim 1 wherein said portion of said body is exposed to said atmosphere.

4. A system as in claim 1 wherein said portion of said body is exposed to said atmosphere.

5. A system for pressurizing an electronic enclosure located in unheated, unpressurized regions of an aircraft, comprising in combination:

a chiller for drying air including a lightweight thermally conducting body with a heat exchanging cavity therein, said chiller for drying air mounted in the aircraft with a portion of said body thermally coupled to the atmosphere outside said aircraft;

an air input passage in said body for coupling air into said cavity and an air output passage in said body for coupling air from said cavity;

an air input duct for coupling air from a heated, pressurized region of said aircraft to said air input passage, and an air output duct for coupling air from said air output passage to said electronic enclosure; and a pressure responsive valve coupled between said input and output ducts for bypassing said chiller when said chiller is clogged with ice condensate.

6. A system for pressurizing an electronic enclosure located in unheated, unpressurized regions of an aircraft, comprising in combination:

a chiller for drying air including a lightweight thermally conducting body with a heat exchanging cavity therein, said chiller for drying air mounted in the aircraft with a portion of said body thermally coupled to the atmosphere outside said aircraft;

an air input passage in said body for coupling air into said cavity and an air output passage in said body for coupling air from said cavity;

an air input duct for coupling air from a heated, pressurized region of said aircraft to said air input passage, and an air output duct for coupling air from said air output passage to said electronic enclosure;

a drain extending from said cavity through said body to said atmosphere outside said aircraft; and a pressure responsive valve coupled between said input and output ducts for bypassing said chiller when said chiller is clogged with ice condensate.

7. A system for pressurizing an electronic enclosure located in unheated, unpressurized regions of an aircraft, comprising in combination:

a chiller for drying air including a lightweight thermally conducting body with a heat exchanging cavity therein, said chiller for drying air mounted in the aircraft with a portion of said body exposed to the atmosphere outside said aircraft;

an air input passage in said body for coupling air into said cavity and an air output passage in said body for coupling air from said cavity;

an air input duct for coupling air from a heated, pressurized region of said aircraft to said air input passage, and an air output duct for coupling air from said air output passage to said electronic enclosure, and a pressure responsive valve coupled between said input and output ducts for bypassing said chiller when said chiller is clogged with ice condensate.

* * * * *